United States Patent [19]

Thompson

[11] Patent Number: 4,463,612

[45] Date of Patent: Aug. 7, 1984

[54] ELECTRONIC CIRCUIT USING DIGITAL TECHNIQUES FOR VORTEX SHEDDING FLOWMETER SIGNAL PROCESSING

[75] Inventor: William L. Thompson, Chardon, Ohio

[73] Assignee: The Babcock & Wilcox Company, New Orleans, La.

[21] Appl. No.: 329,500

[22] Filed: Dec. 10, 1981

[51] Int. Cl.³ ............................................... G01F 1/32
[52] U.S. Cl. .................................................. 73/861.22
[58] Field of Search ........... 73/861.22, 861.24, 861.34; 324/78 J

[56] References Cited

U.S. PATENT DOCUMENTS 3,854,334  12/1974  Herzl .............................. 73/861.22
3,885,432   5/1975  Herzl .............................. 73/861.22

FOREIGN PATENT DOCUMENTS 45182  4/1979  Japan .............................. 73/861.22

Primary Examiner—Gerald Goldberg
Assistant Examiner—Hezron E. Williams
Attorney, Agent, or Firm—Vytas R. Matas; Robert J. Edwards

[57] ABSTRACT

A circuit for processing the vortex shedding frequency signal of a vortex shedding flowmeter comprises a phase detector, switch and low pass filter connected in series. The phase detector receives the vortex shedding frequency and applies it over the normally closed switch to the low pass filter which produces an analog signal corresponding to the frequency of the vortex shedding frequency signal. A voltage controlled oscillator is connected between an output of the low pass filter and an input of the phase detector for tracking the vortex shedding frequency and producing a tracking frequency signal which is maintained when the vortex shedding frequency signal disappears. A range or gain code circuit portion is connected for establishing a set time period during which the frequency signal is accumulated in a counter. The accumulated signal from the counter is utilized as a digital signal corresponding to the vortex shedding frequency signal.

5 Claims, 2 Drawing Figures

ELECTRONIC CIRCUIT USING DIGITAL TECHNIQUES FOR VORTEX SHEDDING FLOWMETER SIGNAL PROCESSING

FIELD AND BACKGROUND OF THE INVENTION

The present invention relates in general to vortex shedding flowmeters and in particular to a new and useful circuit arrangement for vortex shedding flowmeter sensors utilizing digital techniques for processing the flowmeter signal.

It is known that when a non-streamlined obstacle is presented in a fluid flow path that vortices are shed from alternate sides of the obstacle. The obstacle is termed a bluff body and utilized as a vortex shedding flowmeter with sensing means for sensing the passage of the vortices. The frequency of passage of the vortices is directly proportional to the volumetric flow in the flow path.

It is known to amplify the signal from the vortex sensor and to use various structures for the sensor itself.

It is known that the signal for the vortex sensor has fluctuating amplitudes due to non-uniformities in the flow being measured. This gives noisy or fluctuating signals at the output of a flow transmitter using a vortex shedding sensor in many applications. This is observed as an intermittent loss of signal.

Examples of vortex shedding flowmeters and their connecting circuitry can be found in U.S. Pat. No. 4,134,297 to Herzel; U.S. Pat. No. 4,123,940 to Herzl et al.; and U.S. Pat. No. 4,033,188 to Herzl.

One of the units which is utilized in the combination and method of the present invention is the so-called UART unit or Universal Asynchronous Receiver Transmitter. These units are examplified by CMOS-LSI-UART units such as IM-6402 and IM-6403. The receiver section of such units converts serial data into parallel data and the transmitter converts parallel data into serial data. The UARTs can thus be utilized to interface with computers or microprocessors.

Phase-Locked Loop Units, as exemplified by RCA-CD4046B, COS-MOS phase-lock loops include a voltage controlled oscillator which tracks an input frequency and, if the input frequency disappears, maintains the last frequency value. Such a Phase-Lock Loop uses low power and incorporates a low pass filter which produces an analog voltage signal which corresponds to the frequency of the frequency signal being tracked.

SUMMARY OF THE INVENTION

The present invention comprises a circuit for processing the signal coming from a vortex sensor of a vortex shedding flowmeter. Digital electronics are utilized to process the signal and produce a typical output of 4 to 20 mA. A serial digital code is also provided as an output using the same two wires which are also utilized to transmit powder to the circuit. Range change can be provided over the same two wires when indicated by a remote receiver.

The inventive circuit utilizes a phase lock loop arrangement which allows extraction of information from a noisy and partially intermittent vortex flowmeter signal.

Accordingly, an object of the invention is to provide a circuit for processing the vortex shedding frequency signal of a vortex shedding flowmeter comprising a phase detector to receive the vortex shedding frequency and compare it with a locally generated frequency, a low pass filter for receiving the output of the phase detector and producing an analog signal corresponding thereto, a voltage controlled oscillator connected to said low pass filter for generating the tracking frequency signal corresponding to the vortex shedding frequency signal, the phase detector being connected between the voltage control oscillator and an input to the low pass filter, and a holding action in the low pass filter for maintaining the last generated tracking frequency signal when the vortex shedding frequency signal is sensed to have disappeared.

A main object of the invention is to provide the circuit with a signal dropout detector connected to the input of the phase detector and a switch connected between the phase detector and the low pass filter for disconnecting the phase detector from the input of the low pass filter when the vortex shedding frequency signal disappears.

Another object of the invention is to provide a phase detector for receiving the vortex shedding frequency signal and applying it to the low pass filter and for receiving the signal fed back from the voltage control oscillator when the vortex shedding frequency signal is above a predetermined amplitude.

A still further object of the invention is to provide means for accumulating the frequency signal over a determined period of time, the period of time set by range or gain code means.

Another object is to adjust this gain code from a remote location, for example, through selectively connectable series resistors. This remote location is typically a digital control system which utilizes the transmitter electronics, via the single pairing wires connecting the two, as a programmable gain amplifier. This removes work load from the digital controller.

A still further object of the invention is to provide a circuit for processing a vortex shedding frequency signal using digital techniques which is simple in design and economical to manufacture.

DESCRIPTION OF THE PREFERRED EMBODIMENTS

Figure 1:
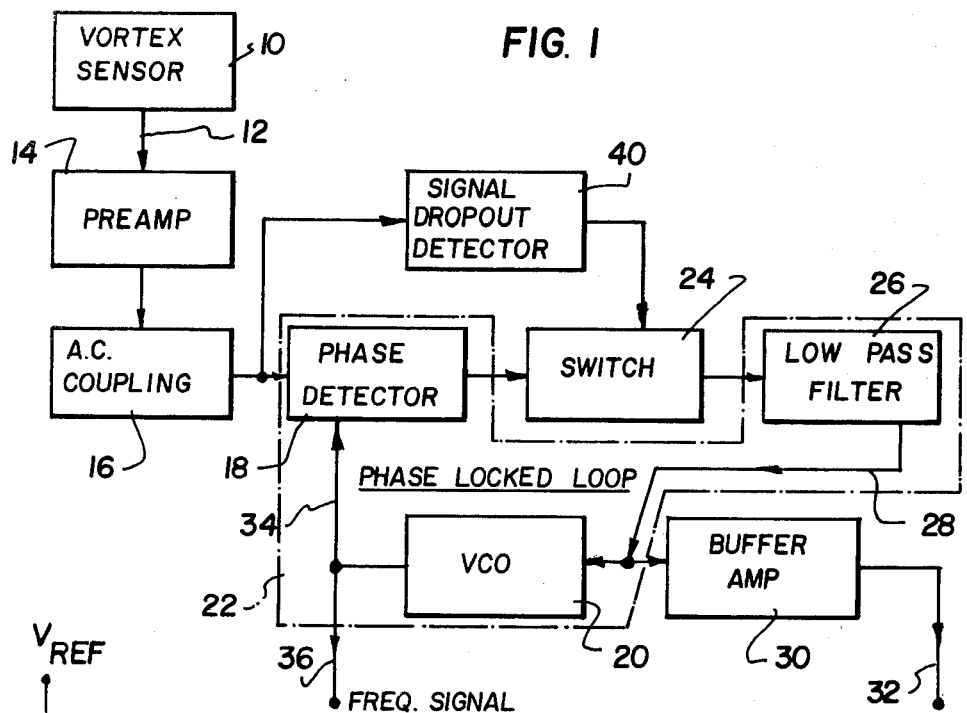
FIG. 1 is a block diagram which, using known circuit components, shows a circuit in accordance with the invention.

Referring to the drawings, in particular, the invention embodied therein in FIG. 1 comprises a circuit for using digital techniques in vortex shedding flowmeter signal devices which comprises a vortex sensor 10, of known design.

As is known, a vortex shedding flowmeter can be prepared by placing a non-streamlined obstruction in a flow path. Alternating vortices are shed from the obstruction, called a bluff body. The rate of creation of these vortices is proportional to the flow rate.

The vortex sensor thus produces a signal over a line 12 which varies with the vortex shedding frequency. The signal is amplified in a preamp 14 and then provided over an A.C. coupling 16 to a phase detector 18. The phase detector 18 can be of the "phase discriminator II" variety as implemented in CD4046B. The phase detector 18 is edge triggered and cooperates with a voltage controlled oscillator (VCO) designed 20. The VCO 20, low pass filter 26 and phase detector 18 combined form a phase lock loop 22.

The output of phase detector 18 is connected over an electronic switch 24 to a low pass filter 26. The low pass filter has an output which is applied over line 28 to a junction and connection between the voltage control oscillator 20 and a buffer amplifier 30. The output of buffer amplifier 30 is supplied over line 32 as an analog signal. The output of voltage controlled oscillator 20 is fed back to the phase detector over line 34 and also tapped over line 36 to form a frequency signal output terminal. In case the shedding frequency falls below acceptable limits or disappears altogether, a phase dropout detector 40 is provided between the input of phase detector 18 and electronic switch 24. Electronic switch, for example in the form of CD4066B, is normally closed when regular vortex shedding pulses are received. When the signal dropout detector 40 senses the loss of signal, switch 24 is opened so that the last value on low pass filter 26 is preserved for signal resumption at a later time.

The circuit can thus operate even during two phase flow regions which are characterized by intermittent bursts of vortex shedding flow frequencies separated by periods of low or totally absent signal. Slug flow of air and water can thus be accommodated when the slug passage time is limited to less than about fifty percent of the time. Signal dropout detector 40 is exemplified by a typical edge triggered, retriggerable one shot MC45138B.

According to the circuit of FIG. 1, the voltage controlled oscillator tracks the incoming vortex shedding frequency and, if the vortex shedding frequency disappears, holds a correct frequency until the signal returns. This allows the signal to disappear for a very few cycles and then reappear without causing the noisy output obtained by prior art circuits. The inventive circuit also operates using low power CMOS digital integrated circuits and as such is power compatible with a two wire 4-20 mA scheme.

In such a case the output of the low pass filter, as amplified by buffer amplifier 30, is an analog voltage which is proportional to the signal frequency. The buffer is a high input impedance opamp and is used to drive a linear output stage.

The circuit components of FIG. 1 and those of FIG. 2 as will be described hereinafter are presented in greater detail to permit those skilled in the art to make and use the invention without undue experimentation in the RCA COSMOS manual 1977.

Figure 2:
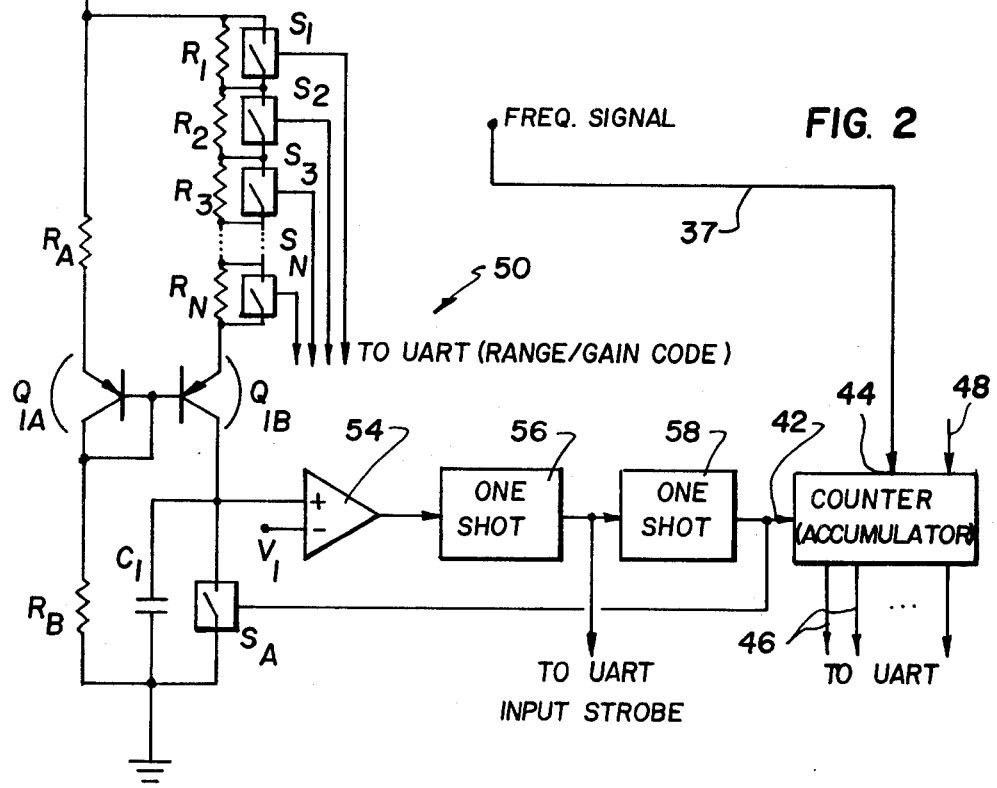
FIG. 2 is a block and schematic representation of another portion of the inventive circuit.

FIG. 2 illustrates an arrangement to interface the vortex shedding frequency with transmission circuitry that requires a digital code. This circuit also permits the transmission circuitry to receive another code to be used to change the range of the transmitter of FIG. 1.

This permits the conversion of the vortex shedding frequency into a convenient and adjustable frequency range and then the digital transmittal of the signal to a remote receiver. Such an arrangement is very advantageous for computer based acquisition applications.

The frequency signal from line 36 of FIG. 1 is connected over line 37 to a counter 42. Counter 42 can be in the form of an accumulator for accumulating the frequency signal presented to its clock input 44. A digital output is produced and provided over output lines 46 to a UART unit which is detailed in the aforementioned RCA COSMOS manual. The accumulator or counter 42 is activated to initiate its function of accumulating the frequency signal from line 37 over its input 48. Accumulator reset input 48 is connected to a timing circuit generally designated 50 which functions to accurately time the active period of accumulator 42 and thus provide the information necessary to accurately determine the frequency from the circuit of FIG. 1.

Timing circuit 50 comprises a plurality of series connected switches $S_1$ through $S_n$ which are each connected in parallel to a respective resistor $R_1$ through $R_n$. The switches are individually activatable by the UART unit for selecting a range or gain code. The series connected resistors $R_1$ through $R_n$ are connected to a resistor $R_A$. The resistors are, in turn, connected to the inputs (emitters) of a double transistor $Q_1A$, $Q_1B$. The bases of this double transistor are connected together as shown with one collector connected over a switch $S_A$ to ground and another collector connected over a resistor $R_B$ to ground. Switch $S_A$ is closed to apply a zero voltage to a capacitor $C_1$ which is connected in parallel to the switch.

Upon resetting the capacitor to zero, it begins to charge. During its charging time the counter 42 counts the vortex shedding frequency presented by the output of the circuit of FIG. 1. This continues until the voltage on capacitor $C_1$ reaches the value $V_1$. This voltage is applied to the positive terminal of a comparator 54. The negative terminal of this comparator is connected to a source of the voltage $V_1$. When the voltages are equal, a one shot 56 is fired which applies a signal to the UART unit which is strobed to read the value on output lines 46. A second one shot 58 is also fired to reset counter 42.

The range of the transmitter, or equivalently its gain or span, can be modified by a code received over a transmission link to the input lines of switches $S_1$ through $S_n$. The current applied to capacitor $C_1$ determines the voltage across the string of resistors $R_1$ through $R_n$ and by the total resistance presented (that is not by passed by switches $S_1$ through $S_n$). The voltage across $R_A$ is a fraction of the reference voltage $V_{REF}$. Therefore:

$$V_{RA} = \frac{R_A}{R_A + R_B}$$

Since the base emitter voltage $Q_{1A}$ (one half the dual transistor) also affects this voltage, a value which is more accurate over a temperature range can be obtained by replacing $R_B$ with a temperature compensating circuit source such as obtained from an LM134/334 integrated circuit.

The current into capacitor $C_1$ becomes $$I = \frac{V_{RA}}{R_{eq}}$$

wherein $R_{eq}$ is the total resistance switched in from resistors $R_1$ through $R_N$ The voltage on Capacitor $C_1$ is calculated from:

$$\frac{dv}{dt} = \frac{I}{C_1} \quad (2)$$

where dv is the voltage change and dt is the time period. This period, dt, is the period the counter operates and is given by:

$$dt = \frac{C_1 dv}{I} \quad (3)$$

Substituting V₁ for dv and combining with equation (1) gives:

$$dt = \frac{C_1 V_{1Req}}{V_{RA}} \quad (4)$$

Req is then a multiple (M, the received code) of a base resistor R and given by:

$$Req = M R \quad (5)$$

this, equation 4 becomes:

$$dt = \frac{C_1 V_1 MR}{V_{RA}} \quad (6)$$

Thus, the period is a contant ($C_1 V_1 R/V_{RA}$) times the received code M. This permits the gain of the transmitter to be changed from a remote location (the UART for example).

The invention thus offers a digital implementation of a vortex shedding flow transmitter having:
1. A reduction in noise.
2. Extended operation into two-phase flow.
3. Conversion of vortex shedding frequency into digital code for transmission.
4. Adjustable gain (or span) controlled from a remote location.

While specific embodiments of the invention have been shown and described in detail to illustrate the application of the principles of the invention, it will be understood that the invention may be embodied otherwise without departing from such principles.

I claim:

1. A circuit for processing the vortex shedding frequency signal of a vortex shedding flowmeter comprising;
   a phase detector for receiving the vortex shedding frequency signal and providing an output signal corresponding thereto;
   a low pass filter for receiving the output of the phase detector and producing an analog voltage signal corresponding thereto;
   a voltage controlled oscillator connected to an output of the low pass filter for generating a tracking frequency signal corresponding to the vortex shedding frequency signal;
   means connected to an output of the voltage control oscillator and the low pass filter for providing a frequency signal and an analog signal; and
   means connected to said phase detector for disabling the operation of the phase detector whenever the vortex shedding frequency signal disappears to maintain the last tracking frequency signal in said phase detector from said voltage controlled oscillator including an electronic switch connected between an output of the phase detector and the input of a low pass filter which is normally closed and a signal dropout detector connected between the input of the phase detector and said switch for detecting the disappearance of the vortex shedding frequency and opening the switch upon such disappearance.

2. A circuit for processing the vortex shedding frequency signal of a vortex shedding flowmeter comprising:
   a phase detector for receiving the vortex shedding frequency signal and providing an output signal corresponding thereto;
   a low pass filter for receiving the output of the phase detector and producing an analog voltage signal corresponding thereto;
   a voltage controlled oscillator connected to an output of the low pass filter for generating a tracking frequency signal corresponding to the vortex shedding frequency signal;
   means connected to an output of the voltage control oscillator and the low pass filter for providing a frequency signal and an analog signal;
   accumulator means connected to said voltage controlled oscillator for receiving the tracking frequency signal;
   timing means connected to said accumulator means for activating said accumulator to accumulate the tracking frequency signal during a selected time period with said accumulator means having digital output lines for generating a digital signal corresponding to the accumulated tracking frequency signal; and
   said timing means including a plurality of resistors connected in series, each having series-connected electronic switch, means for selectively opening said switches for establishing a selected resistance across said plurality of series-connected resistances, a resistor connected to said series-connected resistance, means connected to said connected resistances for producing a current which is proportional to an equivalent resistance formed by said connected resistances, a capacitor connected to said current producing means for charging to a selected level voltage at a time which depends on the current supplied by said current producing means and comparator means connected between said capacitor and said accumulator means for activating said accumulator means during the time that said capacitor charges to said selected voltage.

3. A circuit according to claim 2 wherein said comparator means comprises a comparator amplifier having one input connected to said capacitor and another input connected to a source of said selected voltage, an output of said comparator amplifier connected to said accumulator for activating said accumulator.

4. A circuit according to claim 3, wherein said current producing means comprises a double transistor having emitters connected to said resistances, one collector connected to said capacitor and another collector connected to a resistance.

5. A circuit according to claim 4, including a switch connected in parallel to said capacitor and having a control connection to the output of said comparator amplifier for closing when the voltage of said capacitor reaches said selected voltage to apply a zero voltage to said capacitor.

* * * * *